3,390,006
METHOD OF MAKING CARBON BLACK/SILICA PIGMENT
Robert B. Takewell and Theodore Kohn, Borger, Tex., assignors to J. M. Huber Corporation, Locust, N.J., a corporation of New Jersey
No Drawing. Filed Aug. 30, 1965, Ser. No. 483,844
8 Claims. (Cl. 106—288)

The present invention relates to a combination silica/carbon black pigment and the process for producing the pigment.

In the production of rubber compounds for certain uses it has been long known that combinations of silica and carbon black in the compound will produce desired properties. One of the major uses of such pigment combinations is in off-the-road tires, particularly when made of natural rubber. The properties produced by the pigment combination over either of the pigments used alone are increased tear resistance and reduced chunk out. While other properties of the rubber may be to some extent impaired by the use of pigment combinations, such impairment, while detrimental, does not outweigh the advantages. In the use of pigment combinations the silica, due to its fineness and incapability of being easily pelleted, produces considerable dusting in and about the machines mixing the rubber ingredients and the pigment handling and transferring apparatus.

The dusting problem makes the use of silica most difficult and in some cases impossible.

The primary object of the present invention is to provide a combination silica/carbon black pigment which is dust free.

Another object of the invention is to produce a silica/carbon black combination which is easily pelleted.

A further object of the invention is to produce a combination silica, carbon black pigment which imparts properties to rubber which are better than the properties resulting from the use of silica and carbon black separately in the same recipe.

Other objects and advantages will become apparent from the following specification when considered in light of the appended claims.

Furnace carbon black is normally produced in a carbon black furnace such as that illustrated in U.S. Patent No. 2,971,822. In this furnace the carbon black is formed in the reaction chamber by incomplete combustion and the hot combustion gases are normally cooled with one or more water quenches.

Applicants have discovered that a silica pigment can be dispersed in water and this slurry used in place of the normal water quench. When such a silica slurry is used a combination silica/carbon black pigment is collected in the regular collection system. The combination pigment is hammer milled and then pelleted in the normal manner, producing a dust free product.

The use in rubber of the combination pigment produced by this process resulted in several startling improvements in rubber when compared to the identical rubber compound recipe with the two pigments added separately.

The 300% modulus was increased by approximately 33⅓ percent. Ultimate tensile strength remained the same. Elongation decreased slightly while abrasion resistance was improved by 27%. Tear resistance was also improved and significant improvements were still present when tested at 212° F.

While the tests were most impressive when conducted with natural rubber, improvements were noted in many synthetic polymers as well.

The following examples are illustrative of the invention but are not to be considered as limiting thereto.

Example I

A carbon black furnace of the type illustrated in Patent No. 2,971,822 was operated in the normal manner to produce an ISAF carbon black. The carbon black was hammer milled and pelleted in the normal manner.

A synthetic hydrated silica manufactured by the J. M. Huber Corporation under the trade name Zeo ® 45M having the following properties was used in the recipe below:

| | |
|---|---|
| Bulk density—packed lbs./ft.$^3$ | 15 |
| Color | White |
| Density 25° C. g./ml. | 2.0 |
| Ignition loss @ 900° C. (dry basis) | 3.5 |
| Mean particle diameter millimicrons | 22 |
| Refractive index | 1.44 |
| Surface area, B.E.T. m.$^2$/g. | 132 |

The carbon black and Zeo ® 45M were added separately in the following recipe and the resulting rubber compound was tested with the results as shown in Table I.

| | Parts by weight |
|---|---|
| Natural rubber | 100 |
| ISAF pellets | 37 |
| Zeo ® 45M | 20 |
| Zinc oxide | 5 |
| Stearic acid | 3 |
| Santoflex DD | 0.5 |
| Flectol H | 1.5 |
| Pine tar | 5.0 |
| Turgum S | 2.0 |
| MBTS | 0.8 |
| Sulfur | 2.8 |

Example II

A carbon black furnace of the type shown in U.S. Patent No. 2,971,822 was operated in the same manner as the furnace of Example I except that a Zeo ® 45M aqueous slurry was substituted for the normal water quench. The Zeo ® 45M slurry had 10% solids and was fed to the quench points at a rate so that the final product had approximately 56% carbon black and 44% Zeo ® 45M.

The combined pigment was hammer milled and pelleted in the normal manner of treating carbon black and was then used in the following recipe.

| | Parts by weight |
|---|---|
| Natural rubber | 100 |
| Combined pigment | 45.4 |
| ISAF pellets from Example I | 11.6 |
| Zinc oxide | 5 |
| Stearic acid | 3 |
| Santoflex DD | 0.5 |
| Flectol H | 1.5 |
| Pine tar | 5.0 |
| Turgum S | 2.0 |
| MBTS | 0.8 |
| Sulfur | 2.8 |

This rubber compound was tested with the results shown in Table I. The total Zeo® 45M loading and total carbon black loading were the same in both examples.

TABLE I

| Test | Example | |
|---|---|---|
| | I | II |
| 300% Modulus, p.s.i. | 1,090 | 1,450 |
| Tensile Strength, p.s.i. | 3,360 | 3,320 |
| Elongation, percent | 610 | 580 |
| Hardness | 64 | 66 |
| Abrasion Resistance, percent | 100 | 127 |
| Energy Rebound, percent | 58.9 | 61.6 |
| Tear Resistance, lbs | 450 | 530 |
| Heat Generation Data, °F | 280 | 256 |
| Following tests all at 212° F.: | | |
| 300% Modulus, p.s.i. | 570 | 660 |
| Tensile Strength, p.s.i. | 2,400 | 2,280 |
| Elongation, percent | 780 | 700 |
| Energy Rebound, percent | 73.6 | 76.5 |
| Tear Resistance, lbs | 260 | 285 |

Since in off-the-road tires heat build up is a problem the 212° F. tests of Table I are particularly significant. The combined pigment of Example II did not degrade the properties of the rubber when related to Example I in any appreciable way, but improved the properties in several ways; higher modulus, better abrasion resistance, lower heat generation, higher rebound, and tear resistance.

Example II was repeated with various loadings of silica in the slurry and in the combined pigment with comparable results.

Having thus described the preferred method of the invention it should be understood that the following claims are not limited thereto.

We claim:

1. A method of producing a combination carbon black/silica pigment which includes the steps of producing a carbon black in a carbon black furnace by the incomplete combustion of a hydrocarbon oil, quenching the products of combustion including the carbon black with a silica pigment water slurry in an amount and of a silica concentration sufficient to provide a carbon black/silica pigment having increased modulus and improved abrasion and tear resistance, collecting the combined carbon black silica pigment, hammer milling the combined pigment, and pelleting the combined pigment.

2. A method of producing a combination carbon black/silica pigment having increased modulus and improved abrasion and tear resistance which includes the steps of producing a carbon black in a carbon black furnace by the incomplete combustion of a hydrocarbon oil, quenching the products of combustion including the carbon black with a silica pigment water slurry containing at least 10% silica, collecting the combined carbon black silica pigment, hammer milling the combined pigment, and pelleting the combined pigment.

3. A method of producing a combination carbon black/silica pigment having increased modulus and improved abrasion and tear resistance which includes the steps of producing a carbon black in a carbon black furnace by the incomplete combustion of a hydrocarbon oil, quenching the products of combustion including the carbon black with a silica pigment water slurry, collecting the combined carbon black silica pigment having at least 33⅓% silica, hammer milling the combined pigment, and pelleting the combined pigment.

4. A method of producing a combination carbon black/silica pigment having increased modulus and improved abrasion and tear resistance which includes the steps of producing a carbon black in a carbon black furnace by the incomplete combustion of a hydrocarbon oil, quenching the products of combustion including the carbon black with a silica pigment water slurry containing at least 10% silica, collecting the combined carbon black silica pigment having at least 33⅓% silica, hammer milling the combined pigment, and pelleting the combined pigment.

5. A method of producing a combination carbon black/silica pigment which includes the steps of producing a carbon black in a carbon black furnace by the incomplete combustion of a hydrocarbon oil, quenching the products of combustion including the carbon black with a silica pigment water slurry in an amount and of a silica concentration sufficient to provide a carbon black/silica pigment having increased modulus and improved abrasion and tear resistance and collecting the combined carbon black silica pigment.

6. A method of producing a combination carbon black/silica pigment having increased modulus and improved abrasion and tear resistance which includes the steps of producing a carbon black in a carbon black furnace by the incomplete combustion of a hydrocarbon oil, quenching the products of combustion including the carbon black with a silica pigment water slurry containing at least 10% silica, and collecting the combined carbon black silica pigment.

7. A method of producing a combination carbon black/silica pigment having increased modulus and improved abrasion and tear resistance which includes the steps of producing a carbon black in a carbon black furnace by the incomplete combustion of a hydrocarbon oil, quenching the products of combustion including the carbon black with a silica pigment water slurry and collecting the combined carbon black silica pigment having at least 33⅓% silica.

8. A method of producing a combination carbon black/silica pigment having increased modulus and improved abrasion and tear resistance which includes the steps of producing a carbon black in a carbon black furnace by the incomplete combustion of a hydrocarbon oil, quenching the products of combustion including the carbon black with a silica pigment water slurry containing at least 10% silica, and collecting the combined carbon black silica pigment having at least 33⅓% silica.

References Cited

UNITED STATES PATENTS

| 2,632,713 | 3/1953 | Krejci | 106—307 |
| 3,094,428 | 6/1963 | Hamilton et al. | 106—307 |
| 3,203,819 | 8/1965 | Steenken et al. | 106—307 |
| 3,317,458 | 5/1967 | Clas et al. | 106—307 |
| 3,340,080 | 9/1967 | Henderson | 106—307 |

TOBIAS E. LEVOW, *Primary Examiner.*

S. E. MOTT, *Assistant Examiner.*